J. OWENS.
GREASE GUN.
APPLICATION FILED JULY 11, 1919.
1,379,281.
Patented May 24, 1921.
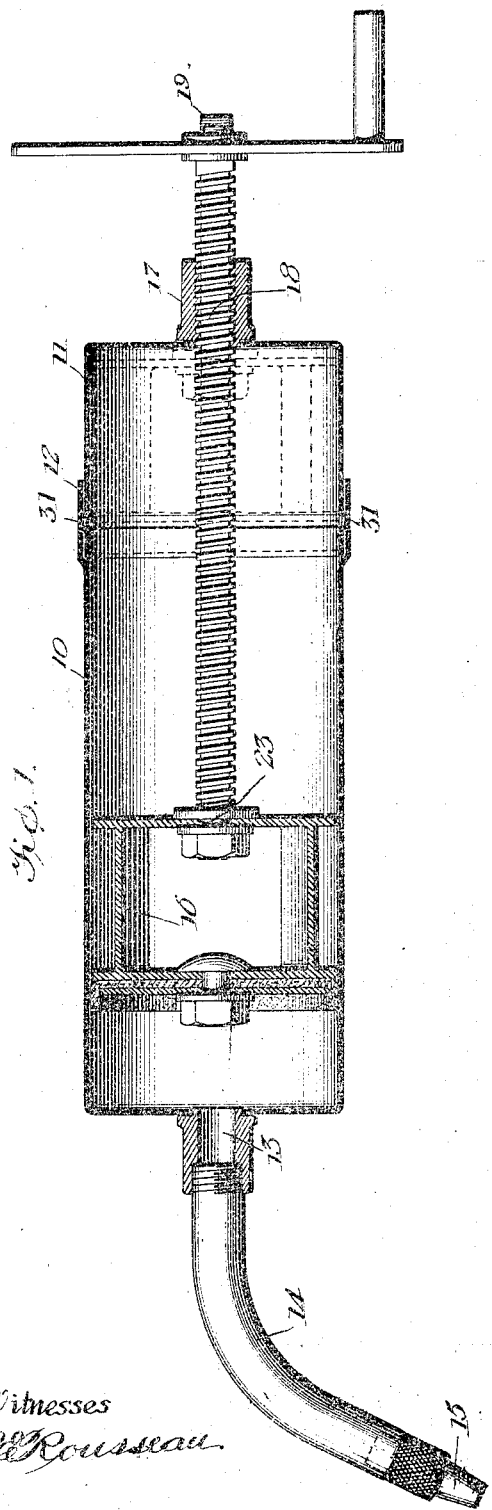
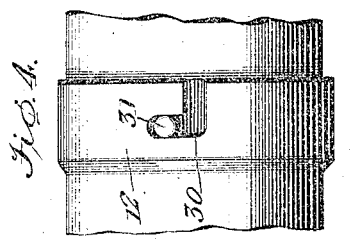
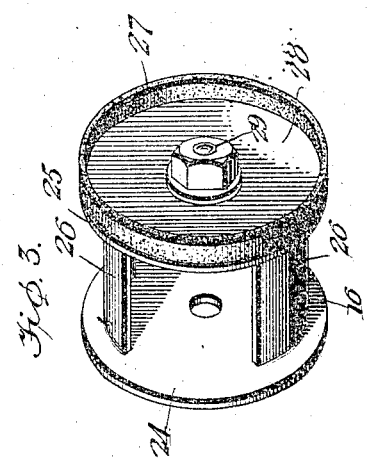
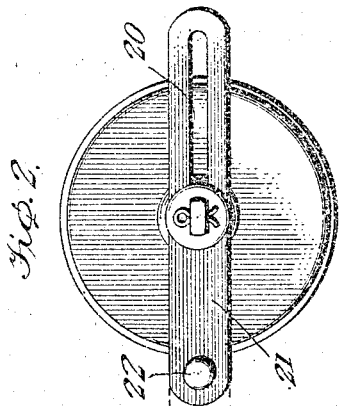
Witnesses
R. E. Rousseau
Inventor
John Owens
By
Munn & Co.
Attorney

UNITED STATES PATENT OFFICE.

JOHN OWENS, OF KINGSTON, IOWA.

GREASE-GUN.

1,379,281. Specification of Letters Patent. Patented May 24, 1921.

Application filed July 11, 1919. Serial No. 310,094.

*To all whom it may concern:*

Be it known that I, JOHN OWENS, a citizen of the United States, and a resident of Kingston, in the county of Des Moines and State of Iowa, have invented a new and useful Improvement in Grease-Guns, of which the following is a specification.

My present invention relates generally to lubricating devices and more particularly to portable hand grease guns whose most common function is the feeding of grease lubricant to the transmission and differential casings as well as universal joints of automobiles. Grease guns of this general type are commonly now in use although frequent trials have clearly demonstrated structural insufficiencies and operating disadvantages which it is the purpose of my present invention to overcome in a structure which is at once simple, strong, durable and capable of ready and economical manufacture.

The disadvantages just mentioned as well as the particular manner in which my invention overcomes the same, will be apparent from the following description, reference being made to the accompanying drawings, forming a part of this specification, and wherein, Figure 1 is a longitudinal section through my improved grease gun, Fig. 2 is a rear end elevation, Fig. 3 is a detail perspective of the plunger removed, and Fig. 4 is a detail side view of the intermediate portion of the barrel.

Referring now to these figures I propose a grease gun whose barrel is in two parts 10 and 11, the part 10 being the major part and preferably formed by successive drawing operations from a single piece of metal, with an offset annular flange 12 at its open end and a discharge fitting or nipple 13 secured centrally in its opposite or closed end. This part of the grease gun being free of projections is by reason of this construction adapted to be easily cleansed of grease adhering to its exterior. Furthermore there being no surplus metal or projections on the grease gun it is light and portable and can be inserted into contracted spaces to supply the grease where required. This discharge fitting 13 is preferably internally threaded at its outer portion for the reception of a discharge tube 14 of any desired form which may have a detachable nozzle 15 for interchangeable purposes.

The other part 11 of the barrel is arranged to telescope at its open end within the flanged open end 12 of the part 10 and is of substantially less depth than the part 10 and in fact of a depth just equal to the depth of the plunger 16 over all. At its other end the part 11 of the barrel has a central internally threaded bearing member 17 through which the axial plunger screw 18 works, this plunger screw having at its external end a reduced flattened portion 19 extending through the elongated slot 20 of a transverse crank arm 21 having an angular crank pin 22 at one end, so that the said crank arm may be shifted inwardly and outwardly with respect to the axis of the barrel.

At its inner end the plunger screw 18 has a revoluble connection at 23 with the rear circular plate 24 of the plunger 16 whose front plate 25 spaced from the rear plate 24 by spaced arcuate wall sections 26 supports a leather 27 by means of a leather holding disk 28 and bolt 29.

It will be noted that the front and rear plates of the plunger 16 are spaced apart a considerable distance in order to give the plunger effective bearing against the inner surface of the barrel, thus avoiding wear of the parts and insuring against the leakage of lubricant rearwardly past the plunger in view of the adaptability of the latter to inequalities, however slight of the barrel, the plunger being arranged to advance without rotation by virtue of its rotative connection with the plunger screw.

It is also obvious that when the two parts of the barrel are separated for the purpose of filling the barrel part 10 with the semi-fluid lubricant, the plunger 16 may be first wholly retracted into the barrel part 11, so that when the two barrel parts are again associated in proper relation, the plunger may be shifted without difficulty into the barrel part 10, whereas without a guide it is equally obvious it would be difficult to insert the plunger with its leather 27 into the open end of the barrel part 10.

To hold the barrel parts normally in connected relation the flange 12 of the part 10 has diametrically opposed bayonet slots 30 one of which is plainly to be seen from Fig.

4, and the barrel part 11 has diametrically opposed studs 31 which engage within the bayonet slots so that the parts thus provide for ready locking or detachment as desired.

I claim:—

1. A portable hand grease gun consisting of a barrel comprising a one-piece major part free of projections on its exterior adapting it when dipped into hard grease to be readily cleansed exteriorly and a one-piece head part with an opening through its top and a piston having a screw thread piston rod with a handle thereon for turning the same, the minor part of the barrel being sufficiently long to house the piston and being telescopically connected to the major part of the barrel whereby the piston may be forced smoothly from the minor to the major part of the barrel by the screw.

2. A portable hand grease gun consisting of a barrel comprising a one-piece drawn metal major part free of projections on its exterior adapting it when dipped into hard grease to be readily cleansed exteriorly and a one-piece head part with an opening through its top and a piston having a screw-thread piston rod with a handle thereon for turning the same, the minor part of the barrel being sufficiently long to house the piston and being telescopically connected to the major part of the barrel whereby the piston may be forced smoothly from the minor to the major part of the barrel by the screw.

JOHN OWENS.